May 1, 1962 D. A. WILHELMSON 3,032,665
DYNAMOELECTRIC MACHINE COOLING ARRANGEMENT
Filed Dec. 4, 1957
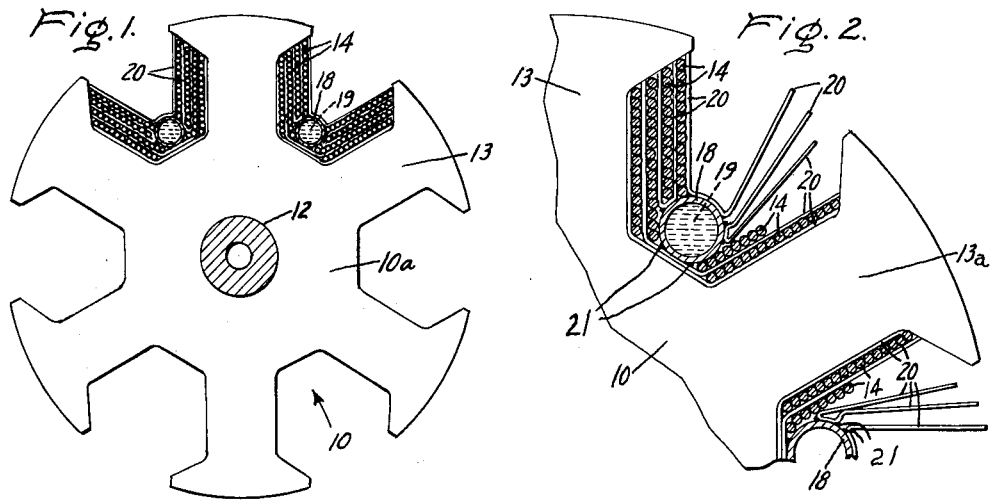
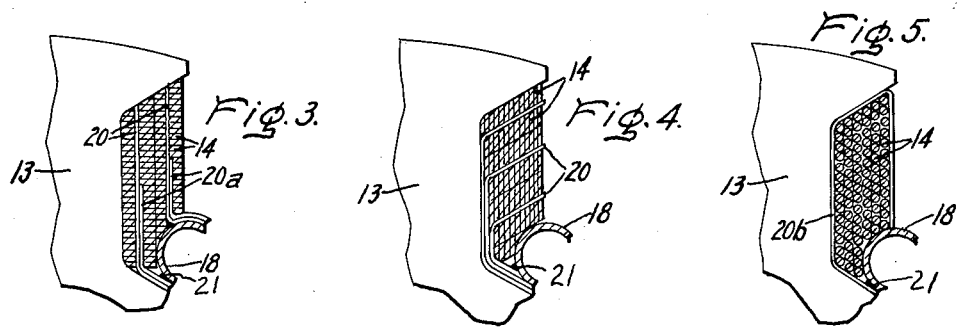
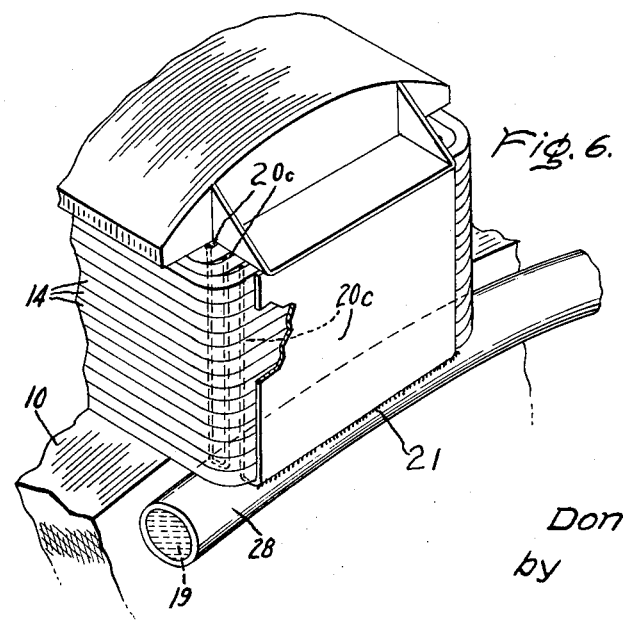
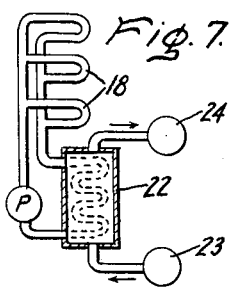
Inventor:
Donald A. Wilhelmson,
by David P. Ogden
His Attorney.

United States Patent Office 3,032,665
Patented May 1, 1962

3,032,665
DYNAMOELECTRIC MACHINE COOLING ARRANGEMENT
Donald A. Wilhelmson, Erie, Pa., assignor to General Electric Company, a corporation of New York
Filed Dec. 4, 1957, Ser. No. 700,577
4 Claims. (Cl. 310—54)

My invention relates to a dynamoelectric machine cooling arrangement and, more particularly, to a dynamoelectric cooling arrangement suitable for operation in an ambient temperature considerably above the maximum permissible operating temperature of the machine.

With speeds through air of more than two times the speed of sound, the temperature of the air in contact with the skin of the speeding body is raised to more than 300° C. Obviously, air at this temperature is of no value for cooling dynamoelectric machines which themselves generate excessive heat and usually must operate at temperatures considerably below 250° C. Attempts have been made in the past to cool dynamoelectric machines hydraulically by providing hollow electric conductors placed within the coils. However, with relatively small machines having many feet of small diameter wire in each coil, such hollow conductors are impracticable because of the space and weight requirements, especially in the aircraft industry. Moreover, any increase in size in the coil of necessity increases the size of the magnetic portions of the machine. Also, past attempts to cool hydraulically a machine by passing fluid through the magnetic portions of the machine adjacent to the windings have proved unsatisfactory because such openings cause inefficiency of the magnetic structure and thus require additional weight in the machine.

Therefore, an object of my invention is to provide an efficient, lightweight, low cost, space saving, hydraulic cooling system for a dynamoelectric machine adapted to be operated in ambient temperatures which prevent air cooling of the machine.

Briefly, in one embodiment of my invention, a tube adapted to carry a cooling fluid is mounted in a space which is adjacent to the windings of a dynamoelectric machine and which would not normally carry sufficient magnetic flux to necessitate magnetic iron core therein. Thermally conductive fins connected to the tube project outwardly into the adjacent windings for conducting heat generated in the wires to the tube and the cooling fluid therein, which conducts it from the machine.

The subject matter which I regard as my invention is particularly pointed out and distinctly claimed in the concluding portion of this specification. My invention, however, as to its organization and method of operation together with further objects and advantages thereof will best be understood by reference to the following description taken in connection with the accompanying drawing, in which:

FIG. 1 shows a sectional view of a rotor of a dynamoelectric machine embodying my invention;

FIG. 2 shows a detail view of a portion of the rotor shown in FIG. 1 to illustrate one method of placing a coil on a rotor pole;

FIG. 3 shows a detail view of a modification of my invention;

FIG. 4 shows another modification of my invention;

FIG. 5 shows another modification;

FIG. 6 shows a perspective view of a further modification of my invention; and

FIG. 7 shows a simplified block diagram of the entire cooling system.

Referring now to the drawing, in which like numbers refer to similar parts, in FIG. 1, I have shown a plan view of a rotor lamina 10 having a base portion 10a of a salient pole machine mounted on a rotatable shaft 12 and provided with a plurality of extensions which form the rotor salient poles 13. The poles 13 extend radially from the base portion 10a. Windings 14 are positioned on each pole to cause flux variation in the normal manner of the rotor of a salient pole dynamoelectric machine. The windings 14 are formed of an electrical conductor wound about the poles 13 in outwardly overlying layers essentially parallel to the axis of the poles 13.

According to my invention, I have provided a hydraulic heat exchange tube 18 adapted to carry a suitable heat exchange fluid 19. The tube 18 is positioned between adjacent poles and extends generally parallel to the axis of shaft 12. The tube 18 is so positioned that it will not disrupt the normal flux paths within the lamina 10. By this arrangement a portion of the space occupied by the tubes 18 might be used by a portion of the windings 14.

In order to facilitate transfer of excessive heat from within the winding 14 to the tube 18, I have secured to the tube a plurality of thin fins 20 made of thermally conductive material such as copper. It is easily seen in FIGS. 1 and 2 that the fins 20 extend from the tube 18 inside, through and outside of the windings 14. Thus, since the fins are adjacent to each side of each individual conductor of the winding 14 and since the conductor insulation is chosen to be a relatively good heat conductor, it is apparent that the temperature gradient between the individual conductors of the winding 14 and the fins 20 will remain relatively small. It is also apparent that heat from the winding 14, will be conducted therefrom before it heats the open space between the winding or before it heats the poles 13.

Since many electric insulators are good thermal insulators, I prefer to select an insulation which may be applied with a thin coating to allow sufficient heat transfer. Also, I prefer to secure the fins 20 by brazing or soldering 21 to the tube 18 to prevent a large temperature gradient therebetween. This construction provides a very effective means of transferring the heat from the conductors within the winding 14 to the fluid 19 within the tube 18 without disturbing the efficiency of the magnetic portions of the machine and necessitating an increased mass of magnetic iron.

The weight of each dynamoelectric machine is critical in aircraft. Thus, every waste ounce must be eliminated, and the size and shape of the tube 18 is critical. The following relationships must be taken into consideration in designing the tube 18.

First, the tube must be large enough to allow the pumping of fluid 19 therethrough without large pumping losses due to friction between the fluid 19 and the walls or inner surfaces of the tube 18. Moreover, the tube must be large enough to carry a sufficient amount of cooling fluid 19 to prevent the temperature gradient between one end of the tube and the other from increasing enough to reduce the efficiency whereby the windings adjacent to the outlet end of the tube would become overheated. Also, the inner surfaces of the tube must provide sufficient cooling area to allow a proper amount of heat exchange to keep the fins 20 relatively cool.

On the other hand, the maximum size of the tubing is limited by the space available for the tubing and by the fact that fluid 19 moving too slowly through the tube will prevent the fluid 19 from scrubbing the walls. By this, I mean that if the fluid 19 moves too slowly, a thermally insulating film of fluid will cling to the inner walls of the tube. This lack of scrubbing action can cause the fluid adjacent to the inner walls to be heated considerably more than the fast-flowing fluid near the center.

Proper cooling of the machine requires a design of the fins 20 thick enough to conduct the heat from within the windings 14 to the tube 18. Moreover, the fins 20 must be made as thin as practicable to prevent appreciable increase in the overall size of the windings. In one 30 kva. machine I have found that copper fins of 20 to 10 mils (thousandths of an inch) thickness will work satisfactorily. Also, silver solder will provide a good thermal connection between the fins 20 and the heat exchange tube 18.

In one particular application, the maximum allowable temperature, determinable by the insulation of the windings, is 250° C. The cooling fluid input temperature is designed to be 165° C. and the output temperature 175° C. If the cooling fluid 19 is allowed to reach too high a temperature, such as 180° C., at the output end of the cooling tube, it will tend to break down or oxidize more rapidly, particularly in the presence of air.

Obviously, the cooling fluid 19 must be carefully selected to withstand these temperatures. Quite often a jet engine lubricant such as MIL–L–7808 synthetic diester is satisfactory for cooling the tube 18. Also, several silicone oils will be satisfactory. In applications where temperatures of the dynamoelectric machine may be higher than 250° C., certain silicone oils may prove superior to jet engine lubricants because they will withstand higher temperatures than 175° C.

Since the ambient air temperature around the aircraft is often considerably above the maximum allowable temperature of the cooling fluid 19, it has been found necessary to cool the cooling fluid 19 in another heat exchanger 22 which is itself cooled by jet fuel being pumped from the jet fuel tank 23 to the jet engine 24 (FIG. 7). Generally at high speeds where it is absolutely necessary to use fluid cooling according to my invention, sufficient jet fuel will be taken from the tanks 23 to provide adequate cooling of the cooling fluid 19 within the heat exchanger 22. However, at lower cruising speeds, insufficient jet fuel is used to provide adequate cooling for the dynamoelectric machine. Under the latter conditions, I have found it is usually preferable to cool the cooling fluid 19 in a radiator (not shown) which is cooled by air.

Referring now to FIG. 2, I have shown one method of assembling a winding 14 with the interleaved cooling fins 20 according to my invention. I contemplate a simple method of assembling a winding on the rotor utilizing my invention to be as follows: Prepare the heat exchanger tube 18, cut to length, secure the fins 20 at the proper location. After the tube has been bent to the proper form, such as the U-shaped loops shown in FIG. 7 for the applications shown in FIGS. 2, 3, 4 and 5, place the exchange tube 18 between the salient poles 13 to provide fluid flow in opposite directions in adjacent tubes. In order to place the winding on the pole 13a (FIG. 2), I prefer to move all but one of the fins 20 away from the pole 13a being wound until the first layer of the winding 14 is in position, at which time the second fin 20 is moved toward the pole to be maintained in position by a second winding layer. In addition to facilitating the placing of the winding on the pole, this method of assembly positions the fins in planes that are parallel to the pole axis nearest them, as shown in FIG. 2. Such a parallel arrangement of the fins is desirable in high temperature applications because it prevents the fins from being moved relative to the winding due to the different coefficients of expansion of the core poles and the winding.

With the fins 20 made of relatively thin thermally conductive material such as 10 mil copper, it is obvious that they may be bent a few times without detrimental effect to their thermal conductivity or to the thermal connection to the heat exchange tube 18.

I contemplate that in some applications where it is necessary to have a relatively high voltage differential between the winding 14 and the tube 18, it will be desirable to place a thin coating of electric insulation on the thermal conducting fins 20. This is particularly desirable because most good thermal conductors are also relatively good electric conductors. One relatively simple method of accomplishing this is to place thin (5–10 mils) sheets of glass cloth coated with polytetrafluoroethylene between each fin and any adjacent conductors.

Referring now to FIG. 3, I have shown a modification suitable for use in a machine that is not subjected to quite as severe heating wherein the number of fins 20 is reduced by using more heat conductivity where it is most needed. The volume required by the fins is reduced by the elimination of a fin adjacent to the pole piece 13 and the placing of fins 20a only in the lower portions of the winding layers. In this modification, the fins 20 and 20a contact each conductor on only one side thereof. In order to provide sufficient thermal conducting capacity, I have used the second stub or short fins 20a to increase the heat conducting capacity of the lower end of the fins 20. This efficient use of copper may also be accomplished by the use of fins that are tapered, i.e., from 30 mils at the base adjacent to the tube 18 to 5 mils at the tip at the top of the winding 14. Obviously, in applications where cost of manufacture is less of a factor in the design, it is feasible to taper all of the fins 20.

Referring to FIG. 4, I have shown another modification wherein the winding may be assembled on the pole without appreciably bending the fins 20. In this modification, all of the fins 20 are initially adjacent to the pole 13 and from there pass between the conductors in a modified tangential direction instead of the radial direction shown in FIGS. 1, 2 and 3. This arrangement also effectively tapers the fins as does the use of the stub fin 20a.

In FIG. 5, I have shown a further modification wherein the space limitations are more important in the particular machine than the heat conductivity. Thus, an envelope is provided with a single fin 20b extending outwardly along the pole 13 and being bent downward over the wound winding 14 after the winding is in place. Obviously, this type of cooling fin will simplify the placing of a winding 14 on the pole 13.

With a relatively short axial length of the rotor lamina 10, it can occur that the total area of the fins 20 within the winding, according to the modifications shown in FIGS. 1–5, will be insufficient to supply the necessary heat exchange for proper cooling. Thus, in FIG. 6, I have shown a modification particularly adapted for use with rotors having a short stack of lamina 10. The heat transfer tube 28 is secured at the end of the rotor and the fins 20c extend therefrom radially around and between the end turns of the windings 14 to cool the end turns and thus cool the machine. I contemplate that, in certain applications, cooling of one end of the machine will provide sufficient cooling. However, in some applications, cooling of both ends will be required. Moreover, it is entirely possible that in a few applications, it will be desirable to cool with axial tubes 18 as shown in FIGS. 1 through 5 and a curved tube 28 as shown in FIG. 6.

While I have shown and described particular modifications of my invention, other modifications will occur to those skilled in the art. For instance, it would be feasible to use cooling tubes directly below and adjacent to the windings in other than salient pole machines without disturbing the magnetic properties of the machine. One such application can be envisioned as a tube 18 in a slightly tapered space within the slot of a dynamoelectric machine with the fins 20 extending upward therefrom. I intend by the appended claims to cover all such modifications as fall within the true spirit and scope of my invention.

What I claim as new and desire to secure by Letters Patent of the United States is:

1. In a dynamoelectric machine, a conductor cooling arrangement comprising, a tube for carrying a coolant, said tube being positioned adjacent to a winding containing a plurality of tightly wound layers of electrically insulated conductors, a plurality of thin thermally conductive fins secured at one of their ends to the tube to be cooled thereby and extending outwardly therefrom to engage thermally the conductors of the winding to facilitate heat flow from said conductors through the fins to the tube, said fins being thicker in cross-section near the ends thereof that are secured to the tube than near the ends thereof farthest from said tube.

2. In a dynamoelectric machine member having salient poles extending radially from a base portion having a longitudinal axis and an electrical conductor wound in outwardly overlying layers essentially parallel to the axis of each pole and forming a rectangular coil disposed about each pole, a cooling arrangement comprising a tube for conducting a coolant therethrough positioned adjacent said base portion between adjacent poles, said tube being generally parallel to the longitudinal axis of said member, and at least one thermally conductive fin disposed between layers of adjacent coils of said adjacent poles, each of said fins heat-conductively secured to one of said tubes whereby heat generated in the coils is conducted to said tube.

3. In a dynamoelectric machine member having salient poles extending radially from a base portion having a longitudinal axis and a rectangular coil comprising an electrical conductor wound in outwardly overlying layers disposed about each of said poles, a cooling arrangement comprising a tube for conducting a coolant therethrough positioned adjacent said base portion between adjacent poles and arranged generally parallel to the longitudinal axis of said member, and a thermally conductive fin heat-conductively disposed between the inside layer of one side of a coil and the associated pole surface adjacent said tube and heat-conductively connected to said tube.

4. In a dynamoelectric machine member having salient poles extending radially from a base portion having a longitudinal axis and a rectangular coil comprising an electrical conductor wound about each pole in outwardly overlying layers essentially parallel to the axis of each pole, a cooling arrangement comprising a tube for conducting a coolant therethrough positioned adjacent said base portion between adjacent poles and arranged generally parallel to the longitudinal axis of said member, and a thermally conductive fin disposed between layers of a side of a coil adjacent said tube and heat-conductively connected to said tube whereby heat generated in said coil is conducted by said fins to said tube.

References Cited in the file of this patent

UNITED STATES PATENTS

| Re. 9,836 | Sawyer | May 18, 1880 |
| Re. 13,704 | Rhodes | Mar. 24, 1914 |
| 2,770,785 | Haagens | Nov. 13, 1956 |
| 2,788,499 | Pappas | Apr. 9, 1957 |
| 2,913,606 | Guardiola | Nov. 17, 1959 |

FOREIGN PATENTS

| 433,209 | Germany | Aug. 24, 1926 |
| 543,949 | Great Britain | Mar. 20, 1942 |
| 769,762 | Great Britain | Mar. 13, 1957 |